United States Patent
Shaw et al.

(10) Patent No.: US 10,110,877 B2
(45) Date of Patent: Oct. 23, 2018

(54) METHOD AND APPARATUS FOR DEPTH ALGORITHM ADJUSTMENT TO IMAGES BASED ON PREDICTIVE ANALYTICS AND SENSOR FEEDBACK IN AN INFORMATION HANDLING SYSTEM

(71) Applicant: Dell Products, LP, Round Rock, TX (US)

(72) Inventors: Timothy C. Shaw, Austin, TX (US); Christopher A. Torres, San Marcos, TX (US); Deeder M. Aurongzeb, Austin, TX (US); Roman Joel Pacheco, Leander, TX (US); Maxwell Andrews, San Francisco, CA (US)

(73) Assignee: Dell Products, LP, Round Rock, TX (US)

( * ) Notice: Subject to any disclaimer, the term of this patent is extended or adjusted under 35 U.S.C. 154(b) by 431 days.

(21) Appl. No.: 14/880,842

(22) Filed: Oct. 12, 2015

(65) Prior Publication Data

US 2017/0104979 A1     Apr. 13, 2017

(51) Int. Cl.
| | |
|---|---|
| *H04N 13/00* | (2018.01) |
| *H04N 13/239* | (2018.01) |
| *G06F 3/0346* | (2013.01) |
| *H04N 13/246* | (2018.01) |
| *H04N 13/271* | (2018.01) |

(52) U.S. Cl.
CPC ......... *H04N 13/239* (2018.05); *G06F 3/0346* (2013.01); *H04N 13/246* (2018.05); *H04N 13/271* (2018.05); *H04N 2013/0081* (2013.01)

(58) Field of Classification Search
CPC .......................... H04N 13/239; H04N 13/246
USPC .......................................................... 348/47
See application file for complete search history.

(56) References Cited

U.S. PATENT DOCUMENTS

| | | | |
|---|---|---|---|
| 9,734,419 B1 * | 8/2017 | Ye .............................. G06T 7/00 |
| 9,838,677 B1 * | 12/2017 | Ramaswamy ......... H04N 17/00 |
| 2016/0037023 A1 * | 2/2016 | Chen .................... H04N 5/2258 348/175 |
| 2016/0037031 A1 * | 2/2016 | Bull ...................... H04N 5/2253 348/374 |
| 2016/0225133 A1 * | 8/2016 | Yang .................. G06K 9/00221 |
| 2017/0070731 A1 * | 3/2017 | Darling ................ H04N 17/002 |

* cited by examiner

*Primary Examiner* — Jeffery Williams
(74) *Attorney, Agent, or Firm* — Prol Intellectual Property Law, PLLC; H. Kenneth Prol

(57) ABSTRACT

A system for determining a loss of calibration in a multi-view stereo imaging system including executing instructions, via a processor, for a multi-view stereo imaging system to process a plural image frame recorded from a plurality of digital cameras of an information handling system and based on plural image calibration parameters and detecting a physical impact event, via a physical sensor, to an information handling system. The system and method execute instructions for a physical impact event detection system to determine, based on physical sensor feedback data, whether a threshold level of a physical impact event has been reached so as to affect calibration of the multi-view stereo imaging system. The detected physical impact event may be a mechanical impact event, a thermal impact event, a vibration mechanical impact event, or another physical impact event.

20 Claims, 9 Drawing Sheets

METHOD AND APPARATUS FOR DEPTH ALGORITHM ADJUSTMENT TO IMAGES BASED ON PREDICTIVE ANALYTICS AND SENSOR FEEDBACK IN AN INFORMATION HANDLING SYSTEM

CROSS REFERENCE TO RELATED APPLICATIONS

Related subject matter is contained in co-pending U.S. patent application Ser. No. 14/815,614 entitled "Method and Apparatus for Compensating for Camera Error in a Multi-Camera Stereo Camera System," filed on Jul. 31, 2015, the disclosure of which is hereby incorporated by reference.

FIELD OF THE DISCLOSURE

This disclosure generally relates to information handling systems, and more particularly relates to a method and apparatus for calibration adjustment based on physical, thermal, or other impacts to multi-view stereo imaging systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Many current information handling systems include integrated camera systems for recording images. The integrated cameras may include compound digital cameras with plural image sensors, individual digital camera systems, or plural digital camera systems of a variety of types.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
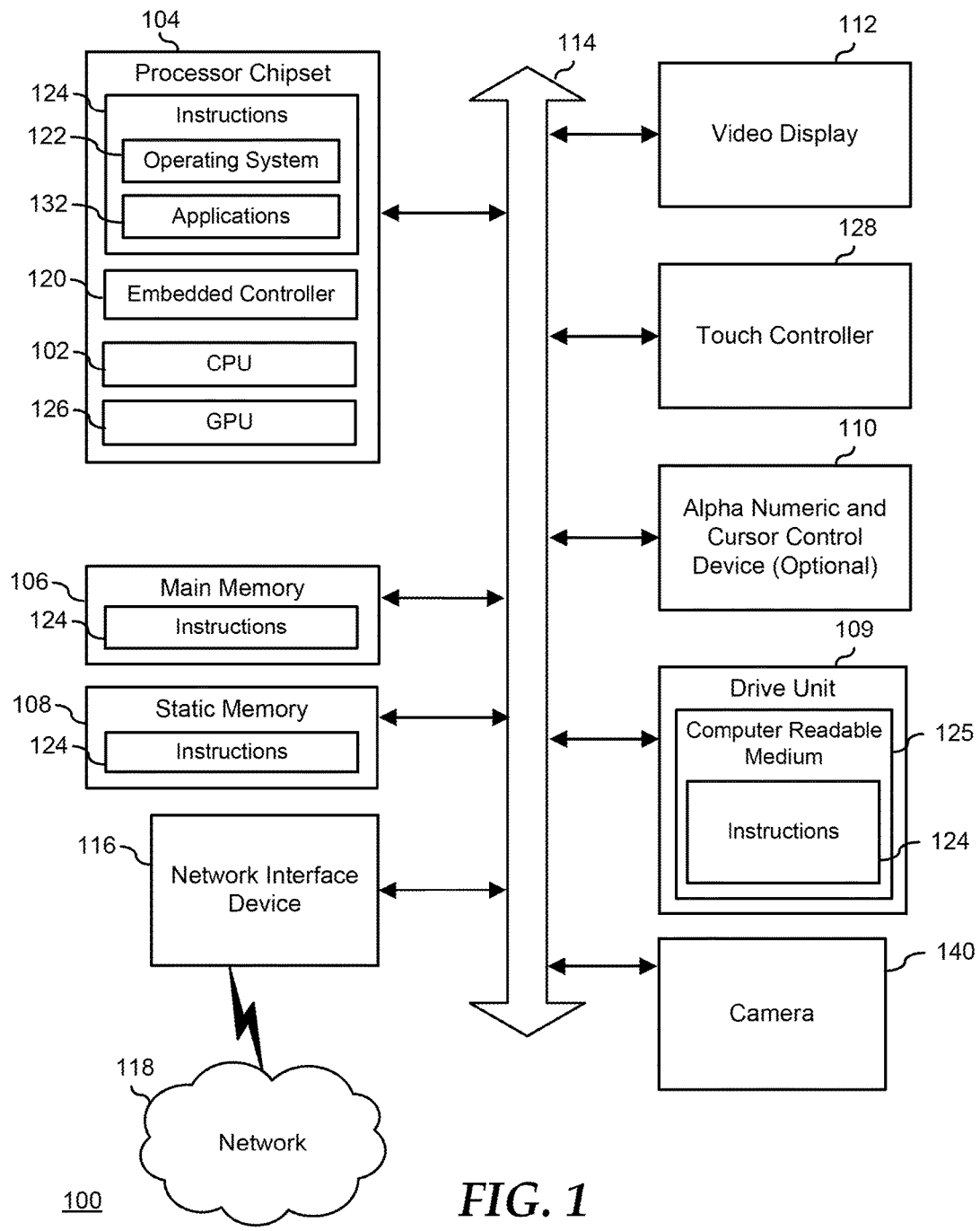
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system, such as mobile information handling systems including personal computer (e.g., desktop or laptop), tablet computer, mobile device (e.g., personal digital assistant (PDA) or smart phone), or other mobile computing platform including wearable computing platforms may include a plurality of digital camera systems serving numerous functions. In an embodiment, an information handling system may include a multi-view stereo imaging system operating with the plurality of digital camera systems. In various embodiments, two digital cameras may be used, more than two digital cameras may be used, or a compound digital camera with plural image sensors may be used with the multi-view stereo imaging system of the present disclosure. Image sensors may include CMOS sensors, CCD sensors, and other image sensors known in the art. Hereinafter, a plurality of digital camera systems shall include a compound camera with plural image sensors.

In an aspect, multi-view stereo imaging systems in information handling systems with a plurality of digital cameras may require precision alignment and calibration to conduct a variety of plural imaging functions including three dimensional (3D) depth imaging operations using a depth determination algorithm. Misalignment or loss of calibration of one or more of the plurality of digital cameras can lead to incorrect operation of plural imaging functions. In information handling systems, for example consumer mobile devices, maintaining alignment over a long period of time may be impractical. This is due to normal wear and tear, traumatic mechanical events, thermal events, vibration due to movement, and many other factors during the course of usage of the information handling system. A multi-view stereo imaging system with a plurality of digital cameras may however be recalibrated after usage or a physical impact event such as a mechanical event, thermal event or vibration mechanical event causes misalignment or loss of calibration. Manual calibration of the multi-view stereo imaging system or the plurality of digital cameras may be unwieldy or difficult in the information handling system with a plurality of digital cameras. Recalibration may occur via a multi-camera error compensating software system according to the present disclosure to adjust plural imaging frame parameters to recalibrate plural imaging functions, including 3D imaging operation. In an embodiment, the multi-camera error compensating system may operate nearly invisibly to determine if calibration of plural image frames is within identified tolerances for specific plural imaging functions to identify loss of calibration or alignment. Notification of the loss of calibration may occur in one aspect of the multi-camera error compensating system. Recalibration may be triggered in accordance with a user's instructions in one aspect of the disclosure or may be triggered automatically upon determination of calibration loss. A physical impact event detection system may coordinate with various sensors associated with the information handling system to determine the occurrence of a thermal impact event, a mechanical impact event, a vibration mechanical impact event, other physical impact event, or any combination. The physical impact event detection system may determine whether a threshold level of any physical impact event has been met to warrant prediction of loss of calibration for the multi-view stereo imaging system. The loss of calibration may also be predicted with respect to magnitude for certain physical impact events such as thermal impact events or vibration mechanical impact events.

In one embodiment, the multi-camera error compensating system may conduct recalibration in coordination with the physical impact event detection system to determine loss of calibration levels. The multi-camera error compensating system may additionally conduct recalibration or even reprocessing of existing plural image frames according to adjusted plural image calibration parameters with minimal user interaction in an aspect of the disclosure. Recalibration parameters may be determined based on predictive tables of digital camera displacement in alignment due to a level of a detected physical impact event. In other recalibration embodiment via the multi-camera error compensating system, the recalibration of the plural imaging data including plural image calibration parameters from the multi-view stereo imaging system may be conducted based on analysis of one or more plural images taken and compared to determine error in the calibration parameters with respect to the digital camera systems. Then recalibration of the plural image calibration parameters may be conducted to modify calibration parameters for plural image frames. The recalibrated plural image calibration parameters serve as error compensation for digital camera misalignment or other errors due to physical impact events to the information handling system. In some embodiments, a plurality of test plural images may be used to increase confidence of the calibration update. In one aspect, the test plural images may be plural image frames previously taken and stored by the multi-view stereo imaging system. Plural images may also include the plurality of raw images recorded by the plurality of digital cameras prior to consolidation into a plural image frame. These raw image components may serve as test plural images as well. Upon recalibration with the multi-camera error compensating software system, one or more plural image frames taken prior to recalibration, but during or after a physical impact event, may be reprocessed to correct errors from decalibration.

For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer (desktop, laptop, all-in-one computer, etc.), a consumer electronic device, a network server or storage device, a switch router, wireless router, or other network communication device, a network connected device (cellular telephone, tablet device, etc.), or any other suitable device, and can vary in size, shape, performance, price, and functionality and price. The information handling system can also be implemented as or incorporated into various devices, such as a laptop computer, a tablet computer, a set-top box (STB), a mobile information handling system, a palmtop computer, a desktop computer, a communications device, a wireless telephone, a smart phone, a wearable computing device, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system can be implemented using electronic devices that provide voice, video or data communication. Further, while a single information handling system 100 is illustrated in FIG. 1, the term "system" shall also be taken to include any collection of systems or sub-systems that individually or jointly execute a set, or multiple sets, of instructions to perform one or more computer functions.

FIG. 1 shows a block diagram of an information handling system 100 capable of administering each of the specific embodiments of the present disclosure. For purpose of this disclosure information handling system 100 can include any instrumentality or aggregate of instrumentalities as described above, and operates to perform one or more of the methods described herein. Further, information handling system 100 can include processing resources, such as a processing chipset 104, for executing machine-executable code instructions 124 of an operating system 122 and various applications 132. Processing resources may include a central processing unit (CPU) 102, a programmable logic array (PLA), an embedded device such as a System-on-a-Chip (SoC), or other control logic hardware. Information handling system 100 can also include one or more computer-readable medium types for storing machine-executable code, such as software or data. Additional components of information handling system 100 can include one or more storage devices including main memory 106, static memory 108, and drive unit 109 that can store machine-executable code or data on various computer-readable medium types, one or more communications ports for communicating with external devices, and various input and output (I/O) devices connected via I/O interfaces. I/O devices may include one or more alpha numeric or cursor control devices 110 including keyboards, mice, touchpads, and touch screens. Additional input and output (I/O) devices include video displays 112, digital camera systems 140, signal generating systems and signal receiving systems (not shown) such as sound, infrared, visible light, or radiofrequency signal systems. Information handling system 100 can also include one or more buses 114 operable to transmit information between the various hardware components.

In an example embodiment, information handling system 100 includes one or more chipsets 104. Chipset 104 in an embodiment may include one or more processors 102, embedded controllers 120, and graphics processing systems such as a graphics processing unit (GPU) 126 among other controllers or processors as specified. In example aspects, the chipset 104 may interface with main memory 104 to utilize and process machine-executable code instructions 124. Main memory 104 may include RAM memory or other memory to store machine-executable code instructions 124 for processing. One or more buses 114 may connect chipset 104 or other processing resources to memory including static memory 108 such as flash memory, or a drive unit 109 such as a disk drive, ROM or other memory. Main memory 106, static memory 108, drive unit 109 may each contain varied types of computer readable medium. For example, drive unit 109 may include a computer readable medium shown as 125 of a variety of sorts known in the art. Each of main memory 106, static memory 108, or drive units 109 may store instructions 124 for the information handling system. Drive unit 109 or static memory 108 may also be controlled by a disk controller or a disk emulator if peripheral to the information handling system. Information handling system 100 can further include a network interface device 116 for connection to network 118.

Processor 102 and processor chipset 104 is operatively coupled to memory 106 via memory bus. GPU 126 may also be operatively coupled to processor 102 via a graphics interface and provides a video display output to one or more video displays 112. Video display 112 is connected to touch controller 128 via touch controller interface. In a particular embodiment, information handling system 100 includes separate memories that are dedicated to processor 102 via separate memory interfaces. An example of memory 106 includes random access memory (RAM) such as static RAM (SRAM), dynamic RAM (DRAM), non-volatile RAM (NV-RAM), or the like, read only memory (ROM), another type of memory, or a combination thereof. Memory 106 can store, for example, at least one application 132 and operating system 122. Operating system 122 includes operating system code operable to detect resources within information handling system 100, to provide drivers for the resources, initialize the resources, to access the resources, and to support execution of the at least one application 132. Operating system 122 has access to system elements via an operating system interface, and may include interface with device drivers.

Graphics interfaces, disk controllers, and I/O interfaces, peripheral interfaces, network interface controllers and other interfaces of the information handling system 100 are operatively coupled to chipset 104 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof according to various embodiments. Chipset 104 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof in certain embodiments. An example of disk interface with static memory 108 or drive unit 109 includes an IEEE 1194 (Firewire) interface, Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof in various embodiments. Alternatively, static memory 108 or drive unit 109 can be disposed within information handling system 100.

Network interface device 116 disposed within information handling system 100 may be located on a main circuit board of the information handling system, integrated onto another component such as chipset 104, in another suitable location, or a combination thereof. Network interface device 116 is connected to chipset 104 via one or more buses 114. Network interface device 116 includes one or more network channels that provide interfacing to devices and other information handling systems that are external to information handling system 100. In a particular embodiment, network channels may be wired, wireless, or a combination of the same as is understood by those of skill in the art. An example of network channels includes wireless telecommunication and data connectivity such as LTE, UMTS/EDGE, EDGE/GSM, CDMA wireless communication standards known in the art. Other example network channels include WiMax, Wi-Fi, Bluetooth, InfiniBand channels, Fibre Channel channels, Gigabit Ethernet channels, proprietary channel architectures, or a combination thereof. Network channel can be connected to external network resources available to the information handling system (not illustrated). The network resources can include another information handling system, a data storage system, another network, a grid management system, another suitable resource, or a combination thereof.

In accordance with at least one embodiment, camera 140 of information handling system 100 comprises one or more digital cameras with three-dimensional (3D) imaging capability. As an example embodiment, the camera 140 can be an INTEL® REALSENSE™ 3D camera or another 3D camera. In an aspect, camera 140 may have multiple camera elements such as with a compound camera system or be a plurality of digital cameras 140 at diverse locations to yield parallax information can be used to determine distances of image elements from the camera. As another aspect, a camera 140 may have a focusable lens to yield differences in sharpness at different distances can be used to determine distances of image elements from the camera. Camera types may include digital RGB cameras, IR cameras, and other cameras with a variety of general and specific image capture capabilities and intended for various image capture purposes as understood in the art.

Information handling system 100 includes instructions 124 to be executed by processor 102 and stored in memory 106, which is connected to processor 102. Processor 102 is coupled, for example, via chipset 104 and one or more buses 114 to the one or more cameras 140. A digital camera 140 can record a first raw image of a scene. The instructions 124 cause processor 102 to record a second raw image of the scene from another image sensor or digital camera 140. The second raw image may record the scene from a different angle. Any number of a plurality of raw images may be recorded by a plurality of digital cameras 140, and the digital cameras 140 are contemplated as having different parallax angles known to the system. The instructions cause processor 102 to construct a composite image based on at least a portion of the first, second, and other raw images for the at least one of the plurality of image elements. The composite image may be referred to as a plural image frame of the scene. In an example embodiment, the instructions may cause three-dimensional (3D) image processing that may correlate distances within the plural image frame, exposure levels, and focal levels over a plurality of image elements or objects within the plural image frame. The instructions cause processor 102 to utilize plural image calibration parameters in processing raw images into a plural image frame. Example plural image calibration parameters include depths, rotation, fields of view, focal lengths and other calibration factors for processing the plural image frame from raw images. In an aspect, this may include 3D image depth processing for the plural image frames to establish distances of elements or objects within a plural image frame.

Alteration to the plural image calibration parameters may occur due to physical impact events such as thermal impacts or mechanical impacts to the plural digital cameras in the information handling system, and in a particular aspect, changes to a mounting device such as a mounting bracket for the plural digital cameras. In accord with at least one embodiment, the instructions 124 may cause processor 102 to implement a physical impact detection system to detect physical impact events and predict alterations to plural image calibration. Also in accordance with at least one embodiment, the instructions 124 cause processor 102 to detect when an image is recorded and one or more plural image calibration parameters is out of calibration. In accordance with at least one embodiment, the instructions 124 cause processor 102 to conduct recalibration of plural image calibration parameters to correct for misalignment or other loss of calibration of one or more digital cameras 140. In accordance with at least one embodiment, the instructions 124 cause processor 102 to determine if one or more plural image frames are out of calibration. In accordance with at least one embodiment, the instructions 124 cause processor 102 to determine if one or more plural image frames that are out of calibration have been modified by a user. In accordance with yet another embodiment, the instructions 124 cause processor 102 to add one or more plural image frames to a reprocessing queue for reprocessing, for example, if captured after a physical impact event. In accordance with at least one additional embodiment, the instructions 124 cause processor 102 to reprocess one or more plural image frames that are out of calibration according to recalibrated plural image calibration parameters. Additional detail for methods or portions of methods for the above described embodiments is discussed further herein.

Figure 2:
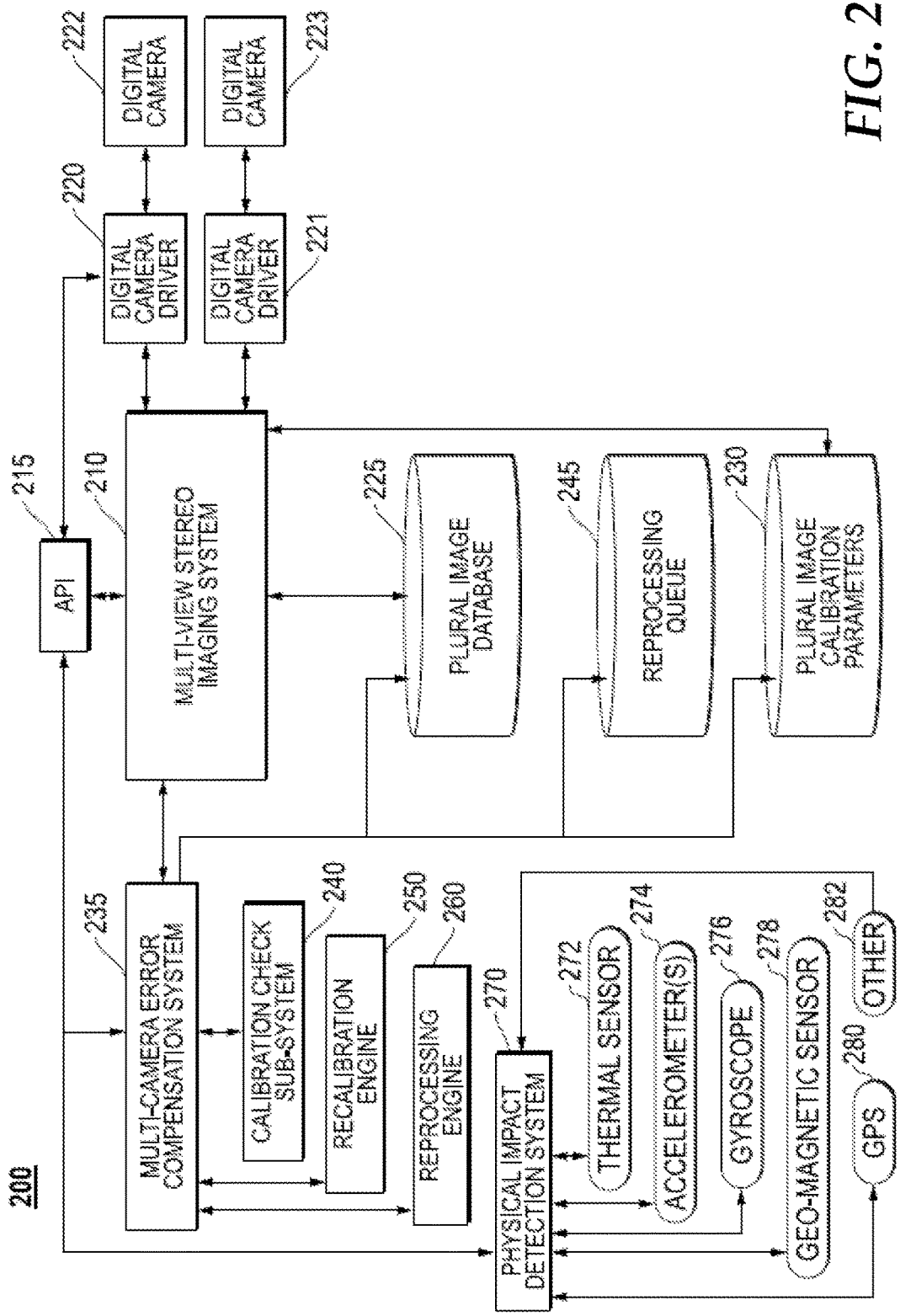
FIG. 2 a block diagram illustrating a multi-view stereo imaging system with multi-camera error compensation and physical impact detection according to an embodiment of the present disclosure.

FIG. 2 shows a block diagram of a multi-view stereo imaging system 200 with physical impact detection and multi-camera error compensation according to one embodiment of the present disclosure. The various aspects of the multi-view stereo imaging system 200 are capable of administering each of the specific embodiments of the present disclosure via execution of code instructions run on a CPU or embedded controller in the chipset(s) of one or more information handling systems as described above. The multi-view stereo imaging system 200 may be implemented as one or more modules of executable software code. The multiview stereo imaging system core module 210 coordinates collection of a plurality of raw images and consolidation of those images in to a plural image frame. The multiview stereo imaging system core 210 may conduct additional processing of plural image frames including 3D processing to determine depth calculations for pixels representing points and objects within a scene of the plural image frame.

The application programming interface (API) 215 may coordinate all code instruction modules that comprise the multiview stereo imaging system 200 and code instructions that function on the information handling systems such as an operating system, device drivers, applications and other software code instructions that may operate in the information handling system. The multiview stereo imaging system core 210 interfaces with the API 215 found in the information handling system software to coordinate various software applications and hardware including the digital camera hardware drivers 220 and 221 operating a plurality of digital cameras 222 and 223 for recording raw images by the information handling system. As explained earlier, it is understood that a plurality of digital camera systems are contemplated and may include two or more digital camera systems in various embodiments. The plural digital camera systems may also include a compound camera with a plurality of image sensors as described above as well. An example API system embodiment may include a Win 32 API or other API software systems as understood in the art. It is further understood that while several distinct code instruction modules are depicted in FIG. 2, that is for illustrative purposes and the software architecture may be employed with one software code module or a plurality of software code modules in addition to what is shown in FIG. 2. Further, it is understood that functionality or operation described for any one of the code instruction modules may be performed by a different instruction code module or a combination of any instruction code modules or sub-systems.

In an example embodiment, the API 215 may coordinate the multiview stereo imaging system core 210, a multi-camera error compensating system 235, a physical impact detection system 270, and digital camera device drivers 220 and 221. The multiview stereo imaging system 200 similarly has a plurality of data repositories including a database for storing plural image frames 225, a database for plural image calibration parameters 230, and a reprocessing queue 245 for plural image frames designated as decalibrated and available for reprocessing after recalibration of plural image calibration parameters. It is understood that the above described databases may be separate or combined into one or more databases or may be distributed among several memory locations in any architecture.

The multi-view stereo imaging system 200 coordinates with a physical impact detection system 270 to determine if digital camera systems, such as 222, 223, or a compound digital camera system, are operating out of calibration. The physical impact detection system 270 may detect any of a plurality of physical impact events to the information handling system. The physical impact events may include thermal impact events, mechanical impact events, vibration impact events, or other physical impact events or any combination. The physical impact detection system 270 may be operatively coupled to a plurality of sensors. Example sensors may include one or more thermal sensors 272, one or more accelerometers 274, one or more gyroscope systems 276, one or more geo-magnetic sensors 278, a GPS system 280, and other sensors available to detect physical impact levels. In an example embodiment, one or more sensors may be coupled to the physical impact detection system 270 that is always on and prepared to detect a physical impact event. In other aspects, the physical impact detection system 270 may be activated by detection of usage of the information handling system. For example, monitoring with the physical impact detection system 270 may be activated due to any motion of the information handling system or an input received by the information handling system. In another embodiment, the physical impact detection system 270 may be activated upon access to the multi-view stereo imaging system by the user, for example, using the camera system. The physical impact detection system 270 may be activated from a dormant or sleep state to prevent the system from unnecessarily consuming power or processing resources when an information handling system is not in use.

Detection of physical impact events meeting a particular threshold magnitude or frequency may permit the physical impact detection system to determine that a loss of calibration is likely within the multi-view stereo imaging system. In a further example aspect, the detection of a magnitude of a physical impact event or a frequency of a physical impact event may provide data to enable a prediction of how much a repeatable physical impact event may put the multi-view stereo imaging system 200 out of calibration. The measured temperature or a vibration force magnitude and frequency are examples. In response, a user may be prompted to agree to recalibration of plural image calibration parameters upon determination of a threshold-level physical impact event by the physical impact detection system 270. In other embodiments, recalibration may be triggered automatically.

The physical impact detection system 270 may additionally allow for efficient prediction of recalibration levels required for the plural image parameters used by the multi-view stereo imaging system 200 and the multi-camera error compensation system 235. For example, a thermal impact event may increase the length of a bracket used to mount the plurality of digital cameras 222 and 223 with a predictable thermal expansion. The length increase of the bracket may be in some proportion to the heat levels detected on the bracket or elsewhere in the information handling system. With an ability to predict a change in distance between the plurality of digital cameras 222 and 223, a prediction of loss of calibration may also be made. Further, recalibration may also be predicted based on detected temperature. The thermal impact data retrieved from a thermal sensor 272 may also be modified by other sensors detecting different aspects of a physical impact event. In one aspect, a GPS or geomagnetic sensor may be used to detect location or altitude which may impact bracket expansion under a thermal load due to pressure variation or other variations. These detection factors may alter the determination of a thermal threshold or the magnitude of a thermal impact event. In another aspect, multiple physical impact events may occur simultaneously requiring the multi-camera error system 235 to account for multiple changes affecting the plural image calibration parameters.

The multi-view stereo imaging system 200 may also utilize a multi-camera error compensating system 235 to determine if digital camera systems 222 and 223 are operating out of calibration with the calibration check subsystem 240. A calibration check sub-system 240 may operate with the multi-camera error compensating system 235 to detect loss of calibration in acquired plural image frames indicating digital camera system error or other errors in addition to the physical impact detection system 270 in some embodiments. Loss of calibration may occur due to a variety of factors including from mechanical movement or contortion of digital camera systems 222 and 223, thermal action, or digital or electronic errors in camera function. As described above, mechanical movement or contortion may take place due to vibration, mechanical drops, heat, or other factors to cause digital camera systems 222 and 223 to move out of alignment. Such camera errors will cause errors during consolidation of raw images recorded via digital camera systems 222 and 223 into plural image frames. Plural image calibration parameters used to consolidate raw images will no longer function as originally calibrated.

The multi-camera error compensating system 235 may also automatically, or after prompting a user, apply recalibration with a recalibration engine 250 to plural image calibration parameters to correct the issues detected. In an example aspect, the recalibration engine 250 may recalibrate the plural image calibration parameters using the altered alignment of digital camera systems 222 and 223 based on the recorded raw images of one or more plural image frames. In another example aspect, certain plural image frames detected as out-of-calibration may be reprocessed with new plural image calibration parameters via a reprocessing engine 260 of the multi-camera error compensating system. In some embodiments, the above sub-systems may be part of the multi-camera error compensating system 235. In other embodiments, it is understood that code instructions executable by a processor for systems 240, 250, and 260 may be independent from one another and operation may be coordinated via API 215.

In some aspects, some or all of the multi-view stereo imaging system 200 may coordinate raw image data, plural image data, or plural image calibration parameters across a network to a remote location for image processing or dynamic recalibration. For example, the multi-view stereo imaging system core 210 may report some or all of the raw images, stereo images, or plural image calibration parameters via a network interface (NIC) to a remote information handling system or remote data repository.

Figure 3:
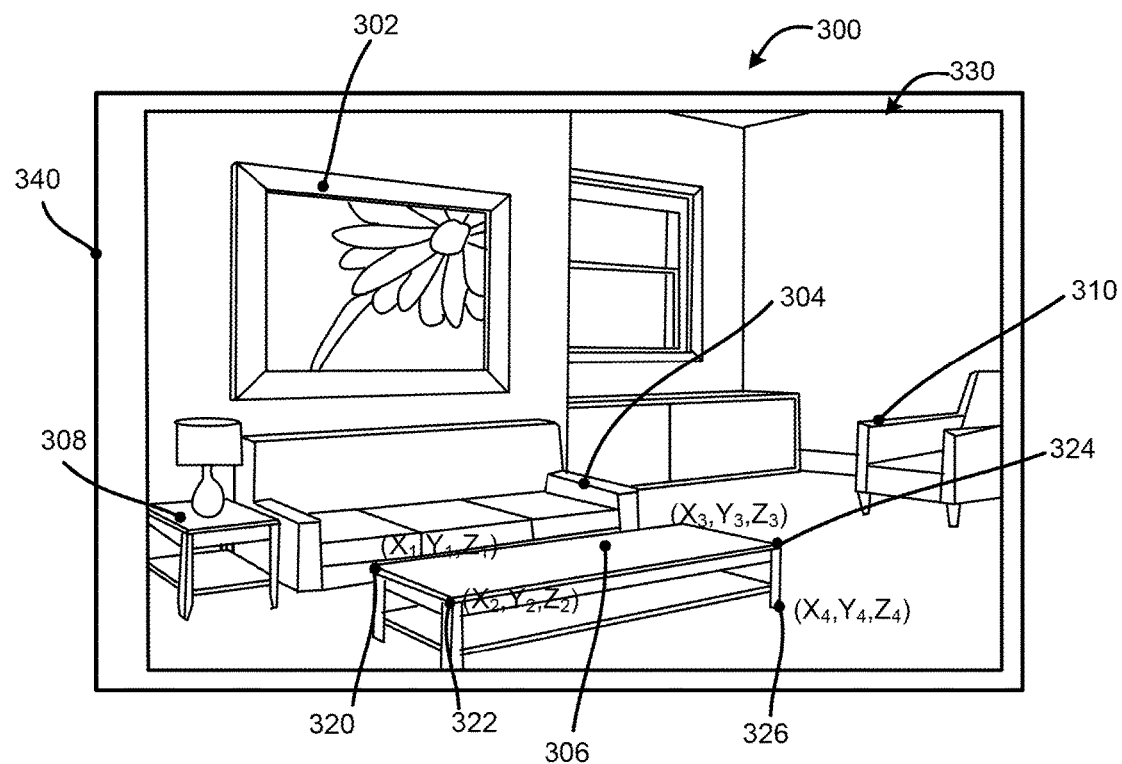
FIG. 3 is a display image diagram illustrating an image of a scene having objects and features at different depth distances recorded from one or more digital cameras according to an embodiment of the present disclosure.

FIG. 3 is a display image diagram illustrating an image of a scene having objects at different distances from an information handling system having a plurality of digital camera systems, wherein the objects are represented by image elements, according to an embodiment of the present disclosure. Image 300 is an example of a plural image frame after 3D image processing with a multi-view stereo imaging system. Image 300 may be comprised of pre-processed raw images acquired with the plurality of digital cameras or with a compound digital c camera according to embodiments described. Image 300 comprises a scene having objects 302 through 308 as example objects within the scene of image 300. Objects 302 through 308 may also have image features such as edges or corners of the objects that are identifiable when raw images are aligned for purposes of calibration checking or re-calibration of plural image calibration parameters. In an example embodiment, image 300 may be displayed on a display screen 330 of an information handling system 340 such as a tablet computing system. Objects 302 through 308 are located at a variety of distances and ranges of depth of distance. In an example embodiment, the plurality of digital camera systems may operate as a 3D camera with 3D image processing via the multi-view stereo imaging system described in the present disclosure. For example, object 302, which represents a picture, is in a moderate background. Object 304, which represents a couch, is illustrated as also in the moderate background. Object 306, which represents a coffee table, is illustrated in a near foreground. Object 308, which represents an end table is also in the moderate foreground, in a less extreme foreground position than object 306. Object 310, which represents a chair, is in a background relative to object 306. Additional objects are shown in the scene of image 300, but not discussed.

The three-dimensional relationships illustrated in FIG. 3 can be discussed with respect to x, y, and z axes, wherein the x axis is defined as being a horizontal axis, the y axis is defined as being a vertical axis, and the z axis is defined as being a distance axis along a path through the plane of image 300 away from a point of view of the plurality of digital camera systems capturing image 300. In accordance with at least one embodiment, using distance information obtained from the plurality of digital camera systems, the distances of image elements, such as pixels, of image 300 from the plurality of digital camera systems can be determined. Processing raw image recordings from the plurality of digital camera systems via the multiview stereo imaging system of the present disclosure permits consolidation of the raw images into a plural image frame. Patterns of such image elements, for example, image elements within the region occupied by object 306, can be recognized, for example, by their proximity in x, y, z space. Once recognized, such patterns can be used to identify objects, such as object 306 and its relation to other objects, such as objects 302, 304, 308 and 310, in the x, y, z space. Image distance coordinates in x, y, z space may be identified at points along an object according to x, y, z coordinates associated with a pixel or pixels at that location in image 300. For example, coordinate distance point $(X_1, Y_1, Z_1)$ is shown at 320. The coordinate distance point $(X_2, Y_2, Z_2)$ is shown at 322, coordinate distance point $(X_3, Y_3, Z_3)$ is shown at 324, and coordinate distance point $(X_4, Y_4, Z_4)$ is shown at 326. As is understood, additional image processing can be performed with respect to each identified object or plurality of objects that are at particular z distance or range of z distances. For example, distances between x, y, z coordinate points may be measurable. As an additional example, objects in space within plural image frames may be identified as objects based on edges or other features in the image. Misalignment of digital cameras or loss of calibration of any plural image calibration parameters may have substantial impact with undesirable consequences on the accuracy of processed plural image frames such as the image 300.

Figure 4A:
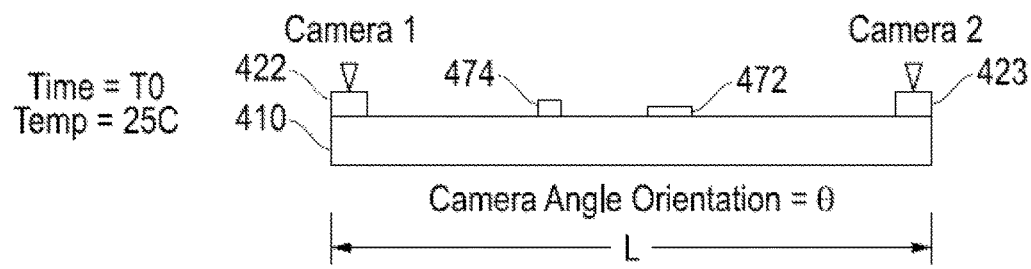
FIG. 4A is a diagram illustrating a plural camera mounting bracket with digital cameras according to an embodiment of the present disclosure.

FIG. 4A is a diagram illustrating an example embodiment of a plurality of digital cameras that may be employed in an information handling system according to an embodiment of the present disclosure. In this particular disclosed embodiment, a first digital camera (Camera 1) 422 and a second digital camera (Camera 2) 423 are disclosed as plural digital camera systems. The first digital camera 422 and second digital camera 423 are shown as mounted to a bracket 410 or other mounting structure. It is understood that bracket 410 and digital camera systems 422 and 423 may be in any configuration designed to support the digital cameras 422 and 423 for the purposes of acquiring plural digital images. For simplicity, a linear bracket 410 is shown. Moreover, in some embodiments, bracket 410 may be of any geometry sufficient to support and preferably immobilize the position of the digital cameras 422 and 423. Bracket 410 may support the first and second digital cameras 422 and 423 at a particular camera angle orientation θ with respect to one another, for example a parallax angle with respect to field of view and focal points. Additionally a camera angle orientation in a second dimension may also be known. An example of a second camera angle orientation (β) in a second dimension (not shown) could include an angle between the focal direction of the two digital cameras 422 and 423 around a linear dimension of linear bracket 410, for example a radial angle. The second camera angle orientation (β) could alter should a torsion or twisting force twist or radially displace the linear bracket 410 in the present embodiment. The bracket 410 may also have additional cameras mounted to it in other configurations and other bracket geometries in other embodiments as is understood. In the example embodiment, FIG. 4A shows a bracket 410 at time t0 and at a temperature of 25° C. as an illustrative starting point.

Bracket 410 may also be made of materials such as metal alloys or other materials with known dimensions such as length (L). The bracket materials may also have known expansion properties in thermal conditions. Additionally the bracket materials may have known stiffness, strength, and toughness, or other properties such as such as elasticity properties, in the face of mechanical impact events. In an example embodiment, bracket 410 may be comprised of one or more materials to limit impact of thermal expansion. Additionally, bracket 410 may be comprised of one or more materials to resist force impact and recover to original shape. Digital camera mountings may also play a part in changes of plural image calibration parameters in light of thermal, mechanical, and vibration mechanical impact events. Damping and other aspects may also be employed in mounting of digital camera systems 422 and 423 as well as mounting bracket 410 in information handling system. These damping systems may be accounted for in determining force levels and directions detected via accelerometers and gyroscope systems for mechanical and vibration mechanical impact events for example.

In an example embodiment, bracket 410 may have one or more thermal sensors 472, such as thermistors, directly mounted to the bracket 410 structure. In other embodiments, thermal sensor 472 may be mounted near bracket 410 or an on-board thermal sensor for the information handling system. Additionally, one or more accelerometers 474 may also be mounted directly to bracket 410 in some embodiments. It is contemplated that other sensors as described above may be mounted to bracket 410 in additional embodiments. In several aspects, sensor systems such as those described above may be physical sensors that typically are included with mobile information handling systems. Data relating to physical impact events may be recorded using the physical sensor systems whether mounted on a bracket supporting digital cameras or generally on-board the information handling system.

Figure 4B:
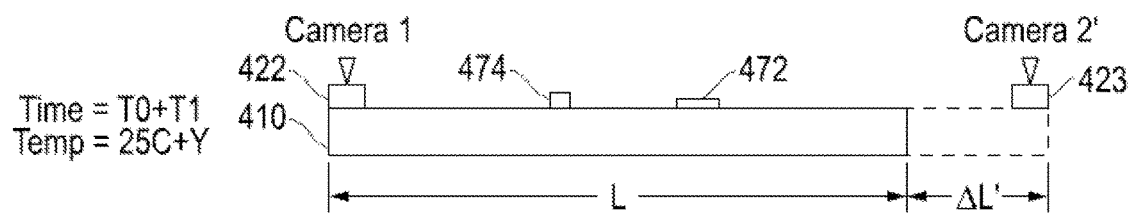
FIG. 4B is a diagram illustrating a plural camera mounting bracket with digital cameras subject to a thermal impact event according to an embodiment of the present disclosure.

FIG. 4B is a diagram, similar to FIG. 4A, illustrating an example embodiment of a plurality of digital cameras that may be employed in an information handling system according to an embodiment of the present disclosure. In FIG. 4B, the time has progressed to time t0+t1. Temperature has increased to 25° C.+Y. Bracket 410 is shown in FIG. 4B with digital camera systems 422 and 423 mounted thereon. Also shown are thermal sensor 472 and accelerometer 474. At temperature 25° C.+Y, the length of bracket 410 is shown to have increase due to thermal expansion. Thermal expansion may have increase the length of bracket 410 by ΔL'. It is understood that the relationship between thermal increase of Y and thermal expansion of the bracket 410 of ΔL' depends on the material or materials used and the dimensions of bracket 410. The relationship between a thermal increase of Y and thermal expansion of the bracket 410 of ΔL' may be a predictable relationship.

Figure 4C:
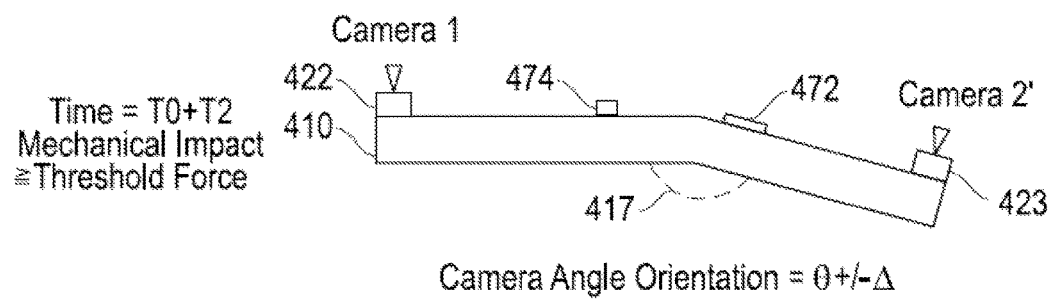
FIG. 4C is a diagram illustrating a plural camera mounting bracket with digital cameras subject to a mechanical impact event according to an embodiment of the present disclosure.

FIG. 4C is a diagram, similar to FIG. 4A, illustrating an example embodiment of a plurality of digital cameras that may be employed in an information handling system according to an embodiment of the present disclosure. In FIG. 4C, the time has progressed to time t0+t2. In this particular embodiment, a mechanical impact event may have occurred that exceeds a threshold level of force so as to have a change in the geometry of bracket 410. Bracket 410 is shown in FIG. 4C with digital camera systems 422 and 423 mounted thereon. Also shown are thermal sensor 472 and accelerometer 474. After the mechanical impact event, the camera angle orientation between digital cameras 422 and 423 in first camera angle orientation is altered by θ+/−Δ. The camera angle orientation may change due to alteration of the bracket 410, changes to the digital camera mountings, or alteration to the digital camera systems 422 and 423 themselves among other factors. It is understood that similarly camera angle orientation in a second dimension such as described above may also be changed by a mechanical impact event. The relationship between camera orientation angles of digital cameras 422 and 423 and any change to camera orientation angles in any direction depends on the material or materials used, the dimensions of bracket 410, the force experienced, and the direction of force. The relationship between a mechanical impact event and change to camera orientation angles may be a predictable relationship. This may be especially true in the example embodiment of a vibration mechanical impact event where the frequency an magnitude of the vibration mechanical event may not permanently change the relationship between the digital camera orientation angles and may be predictable based on the direction, magnitude, and frequency of the vibration mechanical forces applied.

Figure 5:
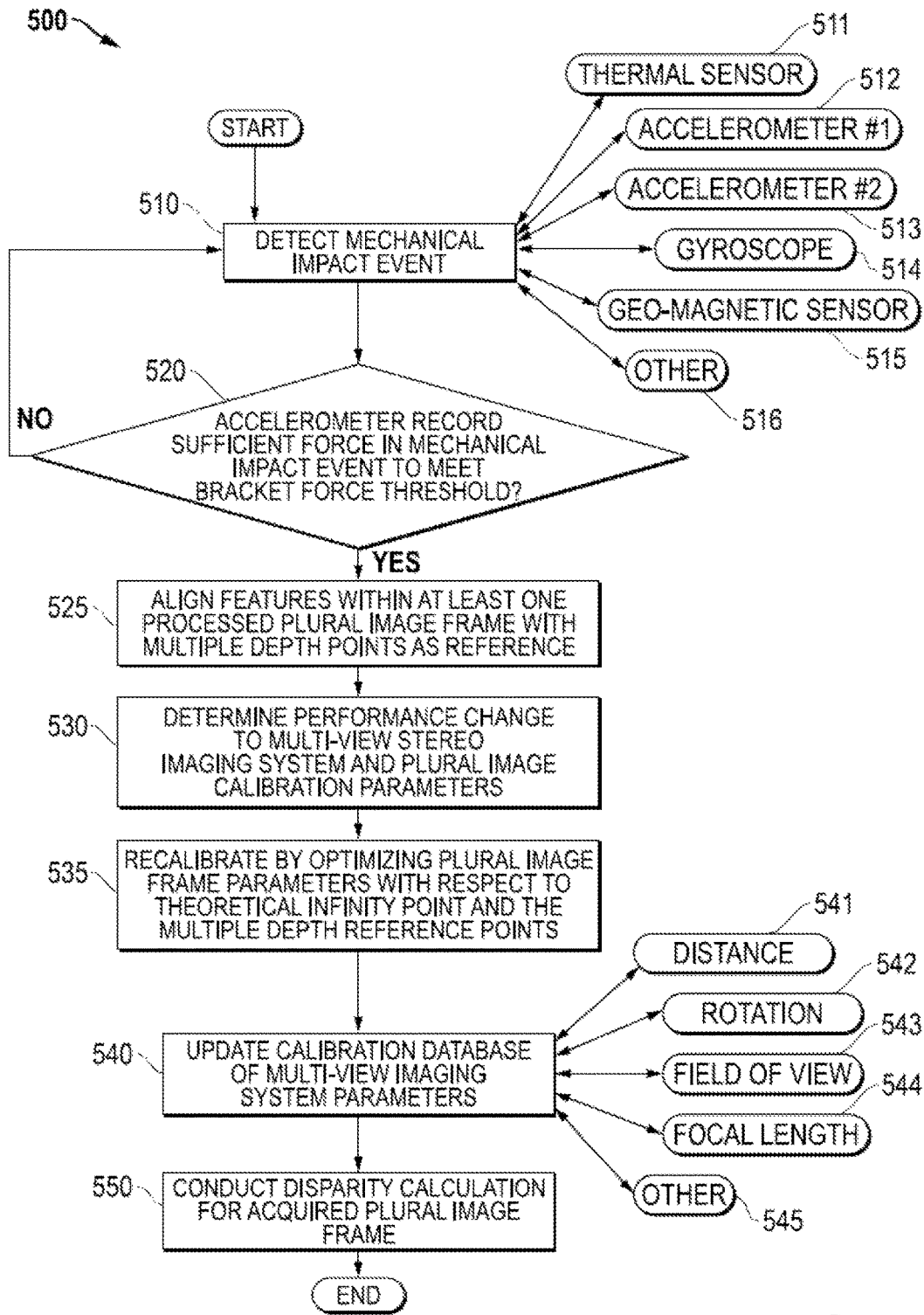
FIG. 5 is a flow diagram illustrating a method of detecting a mechanical impact event and re-calibration via a multi-camera error compensation system according to an embodiment of the present disclosure.

FIG. 5 is a flow diagram illustrating a method of detecting a mechanical impact event causing a multi-view stereo imaging system to be out of calibration according to an embodiment of the present disclosure. In FIG. 5, a physical impact detection system may be used to detect the mechanical impact event. The method may also provide recalibration of plural image parameters via at least one plural image frame or raw images comprising the plural image frame in an example embodiment. In accordance with at least one embodiment, a method is performed in an information handling system having a plurality of digital camera systems or a compound digital camera system. Method 500 begins in block 510 where the physical impact detection system may detect a mechanical impact event. In an example embodiment, the physical impact detection system may receive sensor feedback that includes one or more thermal sensors 511, a first accelerometer 512, a second accelerometer 513, a gyroscope 514, a geo-magnetic sensor 515, and other sensors or systems 516. In example aspect, one or more of the above listed sensors may be mounted on a bracket supporting the one or more digital camera systems. In other example aspects, on-board sensors may be used. The sensors may be used to determine forces applied and direction of forces applied in a mechanical impact event. By determining a direction and magnitude of forces applied, a prediction may be made of displacement in the system between the plurality of digital camera systems by the physical impact detection system. The physical impact detection system utilizes known stiffness, strength, toughness and elasticity properties of the bracket, mounts, and plurality of camera systems including any damping used to absorb forces to determine forces applied.

In an example embodiment, the physical impact detection system may determine forces applied via the accelerometer systems 512 and 513 to back-calculate forces applied during a mechanical impact event such as a fall. In the example of a fall, the back-calculation of forces may be based on weight of the information handling system and duration of a physical impact event. Back-calculation of forces from accelerometer measurements including acceleration of the bracket or information handling system and abrupt deceleration of the bracket or information handling system may yield a reasonable estimation of force applied to the bracket or digital camera apparatus. A gyroscope may record direction of forces applied, for example during a moment of impact in some embodiments.

Proceeding to decision block 520, the method determines if sufficient force has been experienced in the mechanical impact event to cause displacement of the bracket or the digital camera mounting apparatus. In an aspect, the physical impact detection system may access a table with threshold limits of force levels before bracket displacement may occur for various directions of applied force. This table may take into account damping used in mounting and proximity of accelerometer measurements to the bracket or plural digital camera apparatus. If a threshold level of force has been experienced, the physical impact detection system may indicate the possibility of a displacement in the relationship between the plurality of digital cameras mounted, for example, on a bracket. Even a small alteration to the orientation of the plurality of digital cameras may cause a loss of calibration to the plural image calibration parameters for the multi-view stereo imaging system. If the forces applied do not meet a threshold level of impact force to potentially cause displacement, flow returns to block 510.

If a threshold level of force or greater has been applied to the digital camera mounting bracket or other apparatus, then flow proceeds to block 525. At block 525, a plural image frame with raw images are acquired by the multi-view stereo imaging system. A calibration check sub-system of a multi-camera error compensation system may be used to determine if the plural digital camera systems are out of calibration. Features within the raw images of at least one plural image frame are aligned in accordance with disclosures herein and in related applications. Multiple depth points are analyzed with respect to expected values between the raw images to determine loss of calibration.

Proceeding to block 530, the multi-camera error compensation system may determine the performance change levels to the multi-view stereo imaging system by virtue of the alteration to the plural digital camera orientations. As described in other embodiments, one or more plural image frames including raw images may be used for more accurate assessment of change to the multi-view stereo imaging system performance. The multi-camera error compensating system recalibration engine will determine features within the accessed plural image frame or frames. Image features may include corners, edges and other features with similar intensity, contrast changes, color profiles or the like between raw images comprising the plural image. The features are aligned according to multiple depth point references so that similar depth points are aligned. In this way, the images are fit together with respect to depth points within the plural raw images. In an embodiment, several points at depth are utilized as reference points.

At block 530, performance change to the multi-view stereo imaging and the plural image parameters may be assessed with the aligned raw images as a basis of comparison for misalignment, errors in rotation, errors in parallax angle determination, errors in field of view and loss of depth determination. In an example embodiment, performance change may be determined by the change in pixel shift at various depths within an image due to change in the orientation of the plurality of digital cameras. Additional performance changes for the plural image parameters may include determination of error levels of depth distance, rotation, field of view (e.g., stretch or skew in one or more directions) due to non-convergence of projections to theoretical infinity. In some embodiments, one plural image frame may be used for dynamic calibration however it is understood that two or more plural image frames are useful for enhanced reliability of the assessment of performance changes and for the recalibration process.

Flow proceeds to block 535 where recalibration of the multi-view stereo imaging system with the multi-camera error compensation system recalibration engine may be triggered. In recalibration, the plural image calibration parameters may be backward-optimized using the aligned raw image comparison from one or more plural image frames acquired from out of calibration digital camera systems. Based on reference points within the plural image frame or raw image frames, lines of depth may be projected on to a point at theoretical infinity. Thus, the aligned depth reference points for a plural image frame may be adjusted with plural image calibration parameters to show alignment of projected depth lines to a theoretical infinity point again. This backward optimization may be repeated with respect to additional plural image frames to better ensure the adjustments of the plural image calibration parameters. In an example embodiment, the backward optimization is used to correct the convergence from the depth distance reference points for correction to depth distance relationships to pixel shift based on parallax angles from the plurality of digital camera systems. Similarly, rotation deviation from expected angles between sets of feature reference points may be used to backwards optimize rotation parameter values in another example embodiment. Rotation angles may also be determined based on angle misalignment of a theoretical line between two or more known depth reference points between raw images comprising a dual image frame. Thus, necessary rotation rectification may be determined between the raw images recorded on the plurality of digital camera systems. Similarly, field of view dimensions may stretch, squash or otherwise skew the pixel fields between digital camera systems. Rectification factors for calibration of field of view dimensions relative to pixel arrays between raw images may be similarly be modified based on determination of known reference depth points upon recalibration. With more reference points from more plural image frames, additional reliability of backwards optimization may be made with respect to depth distances relative to parallax camera recording angles, rotation of images with any required rotational rectification, field of view dimensions with necessary rectification for field of view between raw images, and focal length changes or alterations to the digital camera systems.

Proceeding to block 540, the error compensated plural image calibration parameters may be updated for the multi-view stereo imaging system in a plural image calibration parameter database. Based on these multiple depth points from one or more raw images in plural image frames, updated plural image calibration parameters may be stored for depth distances 541, rotation 542, field of view 543, and focal lengths 544 and other plural image calibration parameters 545 and may be recalibrated with respect to the plurality of digital camera systems.

With these plural image calibration parameters recalibrated by the above procedure, flow may proceed to block 550 where a disparity calculation may be conducted for the acquired raw images which may then be consolidated into a corrected plural image frame. The corrected disparity data is merged into a final plural image frame and the process may end.

Figure 6:
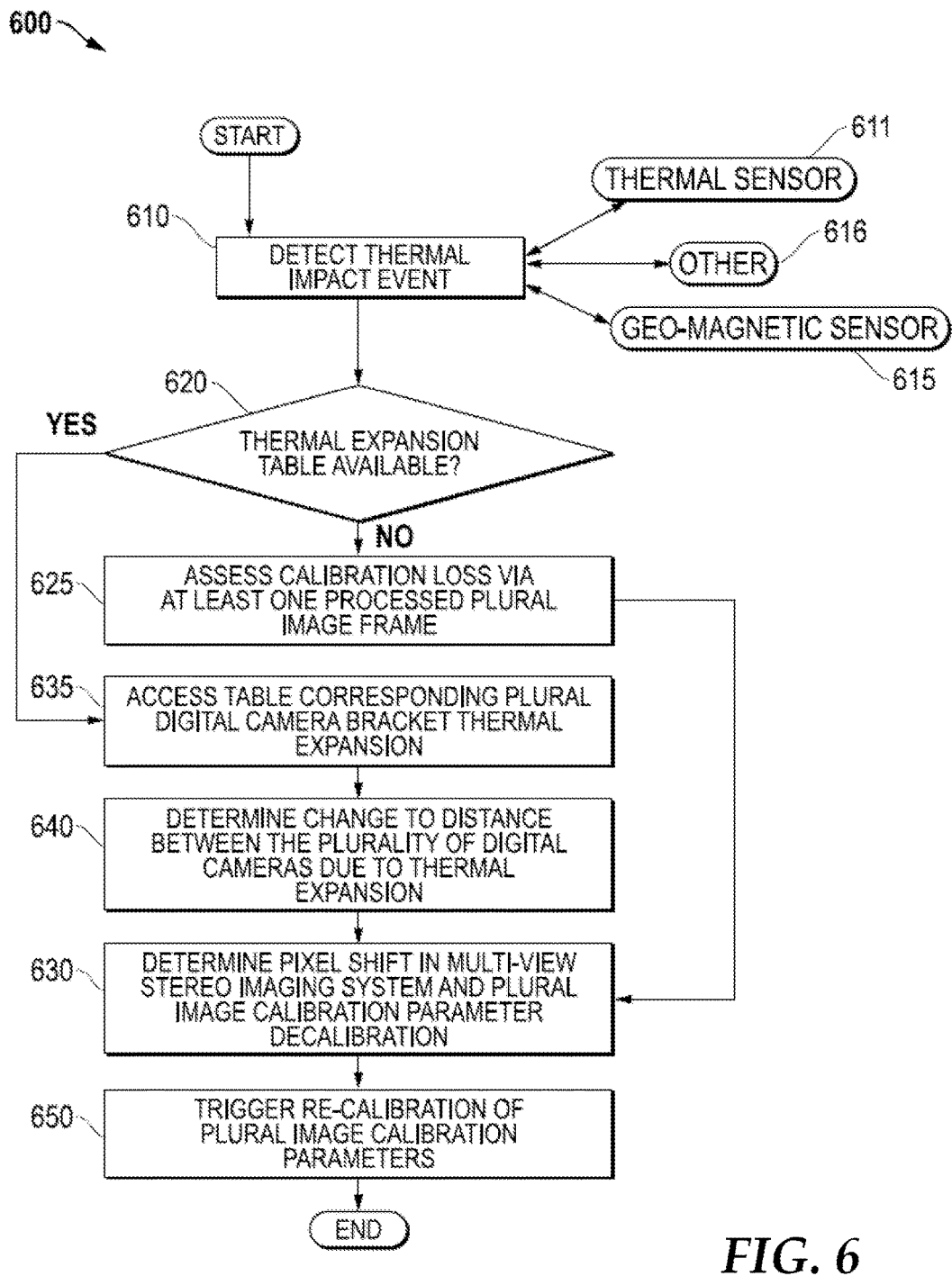
FIG. 6 is a flow diagram illustrating a method of detecting a thermal impact event and re-calibration of plural image calibration parameters according to an embodiment of the present disclosure.

FIG. 6 is a flow diagram illustrating a method of detecting a thermal impact event causing a multi-view stereo imaging system to be out of calibration according to an embodiment of the present disclosure. In FIG. 6, a physical impact detection system may be used to detect the thermal impact event. The method may also provide recalibration of plural image parameters in view of the effects of a thermal impact event.

Method 600 begins in block 610 where the physical impact detection system may detect a thermal impact event. In an example embodiment, the physical impact detection system may receive sensor feedback that includes one or more thermal sensors 611, a geo-magnetic sensor 615, and other sensors or systems 616 such as GPS systems available in the information handling system. In example aspect, on-board sensors may be used or one or more of the above listed sensors may be mounted on a digital camera support bracket. The sensors may be used to determine temperature changes affecting the digital camera support bracket, mountings, or other apparatus. Additionally, geo-magnetic sensors, GPS systems, or the like may be used to determine altitude (pressure) or other aspects such as humidity that may impact thermal effects. The method determines if threshold temperature has been reached sufficient to have a thermal expansion effect on a bracket or other mounting apparatus.

Proceeding to decision block 620, the multi-camera error compensation system determines if a thermal expansion table is available including changes in distance between cameras and recalibration of plural image calibration parameters due to the predicted distance changes. If no thermal expansion table is available, flow then proceeds to block 625. At block 625, determination of calibration loss is done according to embodiments described herein. For example, a calibration check subsystem may determine by comparison of aligned feature points in raw images of a plural image frame that alignment, rotation, or distance calculation fall outside an error level or other indications that calibration has been lost. Flow proceeds to block 630 to determine the level of performance change such as a pixel shift error due to the thermal effects. Alignment of raw images features to determine deviation from expected results using the plural image parameters is used to determine the level of loss of calibration. At block 650, recalibration is conducted via at least one or more plural image frames or raw images comprising those plural image frames according to embodiments of recalibration disclosed herein involving a calibration engine for a multi-camera error compensation system. Backward optimization, such as from projection of feature points to a convergence at a point at theoretical infinity is used to determine recalibration necessary for the plural image calibration parameters.

If a thermal expansion table is available at decision block 620, flow proceeds to block 635 to access the table corresponding to the thermal expansion for the digital camera mounting bracket. It is understood that analogous predictive algorithmic tables may be used in other embodiments for prediction of changes in linear or radial dimensions and angles for the plurality of digital cameras in response to predictable effects of other physical impact events. For example, certain mechanical impact events may be predictable, or vibration mechanical impact events with consistent force or frequency may be predictable as well. At block 640, the thermal expansion table may predict the change in distance between the plurality of digital cameras due to thermal expansion. With this information, the multi-camera error compensation system may then predict the change in performance of the multi-view stereo imaging system and level of loss of calibration of the plural image calibration parameters at block 630. This determination may trigger recalibration of the plural image calibration parameters as predicted from the predicted distance change between the plurality of digital cameras due to thermal expansion table determination. It is further understood that in other embodiments such as mechanical impact events, including traumatic or vibration mechanical impact events, predictability of displacement of the plurality of digital cameras is possible. For example, in vibration mechanical impact events, approximately consistent oscillation and vibration event force magnitude may yield predictable displacement such that a table of recalibration may be established.

In other embodiments, the multi-view error compensation system may instead use a recalibration engine to compare raw images of one or more plural image frames acquired during a thermal impact event. The recalibration engine may assess recalibration required for the plural image calibration parameters in accordance with embodiments disclosed herein. As more plural image frames are analyzed for recalibration, it is understood that the confidence of recalibration determination is increased in the latter embodiment.

Since recalibration parameters associated a thermal impact event may be temporarily changed until after the thermal impact event ends or temperature changes to a higher or lower degree, the recalibration parameters are associated with the plural image frames and raw images acquired during the thermal impact event only. Plural image calibration parameters may return to normal values, for example, after the thermal sensors indicate that temperature has returned to a lower level.

Figure 7:
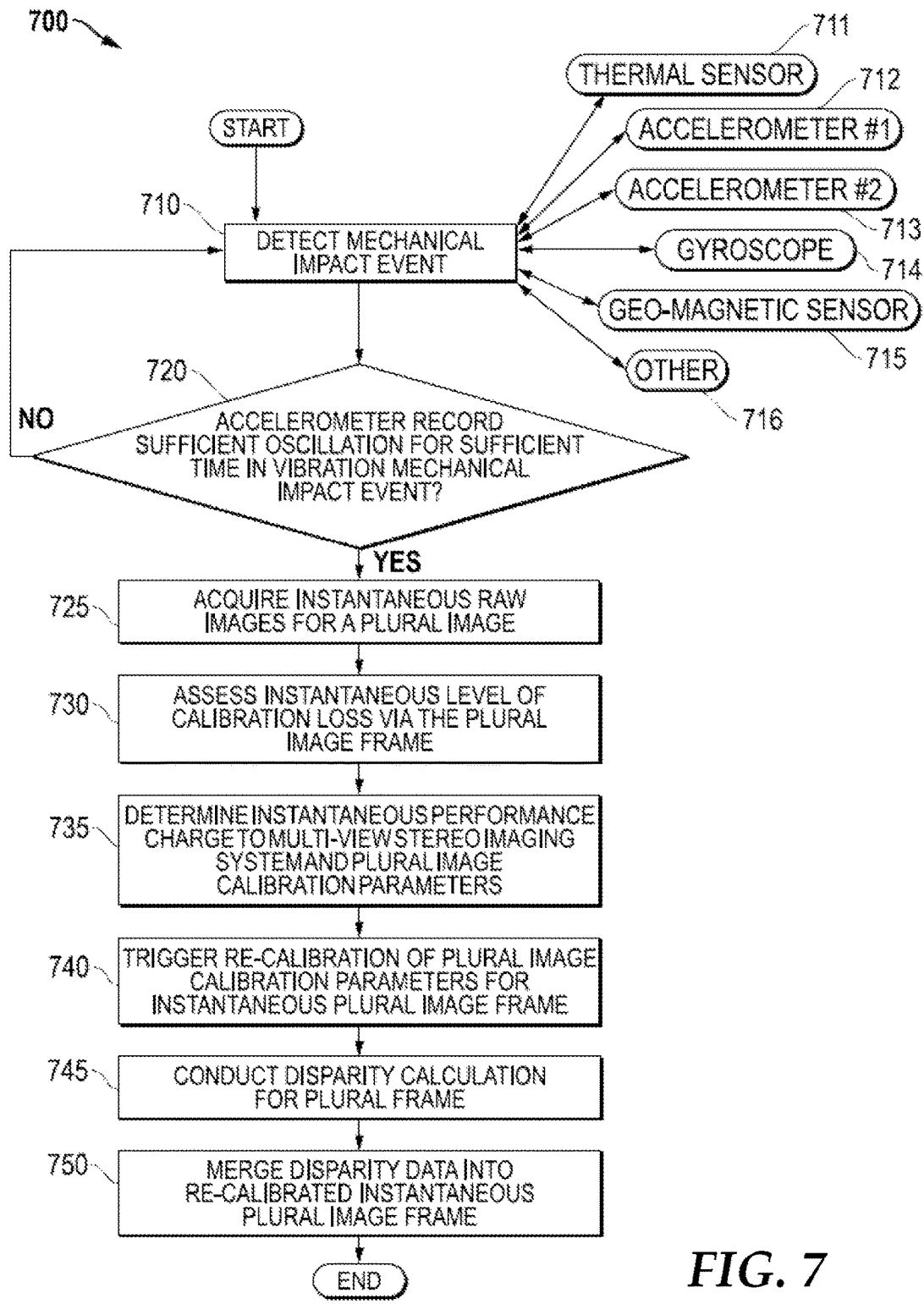
FIG. 7 is a flow diagram illustrating a method of detecting a vibration mechanical impact event and re-calibration of plural image calibration parameters according to an embodiment of the present disclosure.

FIG. 7 is a flow diagram illustrating a method of detecting a vibration mechanical impact event causing a multi-view stereo imaging system to be out of calibration according to an embodiment of the present disclosure. In FIG. 7, a physical impact detection system may be used to detect the vibration mechanical impact event. The method may also provide recalibration of plural image parameters via at least one plural image frame or raw images comprising the plural image frame in an example embodiment. The at least one plural image frame or raw images may be acquired by the plurality of digital cameras during the vibration mechanical impact event. In accordance with at least one embodiment, a method is performed in an information handling system having a plurality of digital camera systems or a compound digital camera system. Method 700 begins in block 710 where the physical impact detection system may detect a vibration mechanical impact event. In an example embodiment, the physical impact detection system may receive sensor feedback that includes one or more thermal sensors 711, a first accelerometer 712, a second accelerometer 713, a gyroscope 714, a geo-magnetic sensor 715, and other sensors or systems 716. In example aspects, one or more of the above listed sensors may be mounted on a bracket supporting the one or more digital camera systems or may be on-board sensors to the information handling system. The sensors may be used to determine forces applied and direction of forces applied in a vibration mechanical impact event including duration and frequency of a vibration mechanical impact event. By determining a direction and magnitude of forces applied, a prediction may be made of displacement in the system between the plurality of digital camera systems during the vibration mechanical impact event. The physical impact detection system utilizes known stiffness, strength, toughness and elasticity properties of the bracket, mounts, and plurality of camera systems including any damping used to absorb forces and vibration to determine forces applied. Timing may be conducted of the duration of vibration mechanical impact event and determine frequency of forces applied by the physical impact detection system.

Flow proceeds to decision block 720 to determine if sufficient oscillation and vibration time has been experienced in a vibration mechanical impact event. In an example embodiment, the physical impact detection system may determine forces and oscillation applied via the accelerometer systems 512 and 513 to back-calculate forces applied and their frequency. In the example of a vibration mechanical impact event, the physical impact detection system may access a table with threshold limits of force levels, vibration frequency, and duration of vibration before error correction measures are triggered for plural image frames acquired during a vibration mechanical impact event. As before, this table may take into account damping used in mounting and proximity of accelerometer measurements to the bracket or plural digital camera apparatus. If a threshold level of vibration force, oscillation, and duration has been experienced, the physical impact detection system may indicate the possibility of a displacement in the relationship between the plurality of digital cameras mounted, for example, on a bracket during the vibration mechanical impact event. Even a small alteration to the orientation of the plurality of digital cameras may cause a loss of calibration, thus some error correction may be warranted. However, in an embodiment, every movement or vibration of an information handling system may not warrant error correction computation. A table of threshold vibration mechanical impact event levels may be set in BIOS or accessible elsewhere by the physical impact detection system. Thresholds may include a number of vibration oscillations. In a specific example embodiment, 10 vibration oscillations may be sufficient to trigger assessment and recalibration for plural image frames taken during the vibration mechanical impact event. In another example embodiment, a frequency threshold level and a duration of vibration may be set as thresholds. In a specific example embodiment, one vibration oscillation detected per second for a period of 10 seconds may be an example threshold level sufficient to trigger assessment and recalibration. If the vibration applied does not meet a threshold level of impact to potentially cause displacement or error, flow returns to block 710.

If a threshold level of vibration oscillation force or duration has been applied to the digital camera mounting bracket or other apparatus, then flow proceeds to block 725. At block 725, at least one plural image frame with raw images is acquired by the multi-view stereo imaging system during the vibration mechanical impact event. At block 730, the calibration check sub-system of a multi-camera error compensation system may be used to determine if the plural digital camera systems are out of calibration. Features within the raw images of at least one plural image frame are aligned in accordance with disclosures herein and in related applications to determine calibration. Multiple depth points are analyzed with respect to expected values between the raw images to determine loss of calibration.

Proceeding to block 730, the multi-camera error compensation system may determine the performance change levels to the multi-view stereo imaging system by virtue of the alteration to the plural digital camera orientations due to vibration. The loss of calibration due to vibration is likely a temporary loss of calibration in many embodiments. Thus, an instantaneous error correction is triggered via the multi-camera error compensation system recalibration engine at block 740. As described in other embodiments, one or more plural image frames including raw images may be used for more accurate assessment of change and recalibration for the multi-view stereo imaging system performance and plural image calibration parameters. The multi-camera error compensating system recalibration engine will determine features within the accessed plural image frame or frames such as corners, edges and other features with similar intensity, contrast changes, color profiles or the like between raw images. Aligning the features according to multiple depth point references so that similar depth points are aligned permits the raw images to be fit together with respect to depth points. Comparison of these depth points and their convergence with point at theoretical infinity point may be used to determine performance alterations and adjustments to the plural image calibration parameters in accordance with embodiments discussed herein and in related applications incorporated herein by reference. Recalibration may be conducted to correct changes in performance due to incurred errors for the plural image parameters including errors of depth distance, rotation, field of view (e.g., stretch or skew in one or more directions) due to non-convergence of projections to theoretical infinity. In an example embodiment, the recalibration of plural image calibration parameters may be directly assigned to plural image frames acquired during the vibration mechanical impact event. Since the vibration mechanical impact event is likely a temporary error condition for the multi-view stereo imaging system, the recalibrated plural image parameters may be save with respect to only image acquired during the instant vibration mechanical impact event.

In another embodiment, a correlation between vibration levels and loss of calibration may be made for the mounting apparatus for the plurality of digital cameras such that prediction of calibration loss may be determined based on magnitude of vibration forces applied and frequency of vibration oscillation. In such a case, detection of a vibration mechanical impact event by the physical impact event detection system may trigger recalibration levels to be available via index of vibration force levels and oscillation frequency for plural image calibration parameters. In an example embodiment, vibration-induced loss of calibration and performance changes may be predictable with vibration events having approximately consistent vibration force magnitude and approximately consistent oscillation. For example, an information handling system having a multi-view stereo imaging system may travel in a vehicle having an approximately consistent vibration force and oscillation frequency on the plurality of digital cameras. As previously described, although one plural image frame may be used for calibration, it is understood that two or more plural image frames are useful for enhanced reliability of the assessment of performance changes and for the recalibration process.

With these plural image calibration parameters recalibrated by the above procedure, flow may proceed to block 745 where a disparity calculation may be conducted for the acquired raw images of the plural image frame acquired during the vibration mechanical impact event. At block 750, the disparity calculation and raw images may then be consolidated into a corrected plural image frame. At this point, the process may end.

Figure 8:
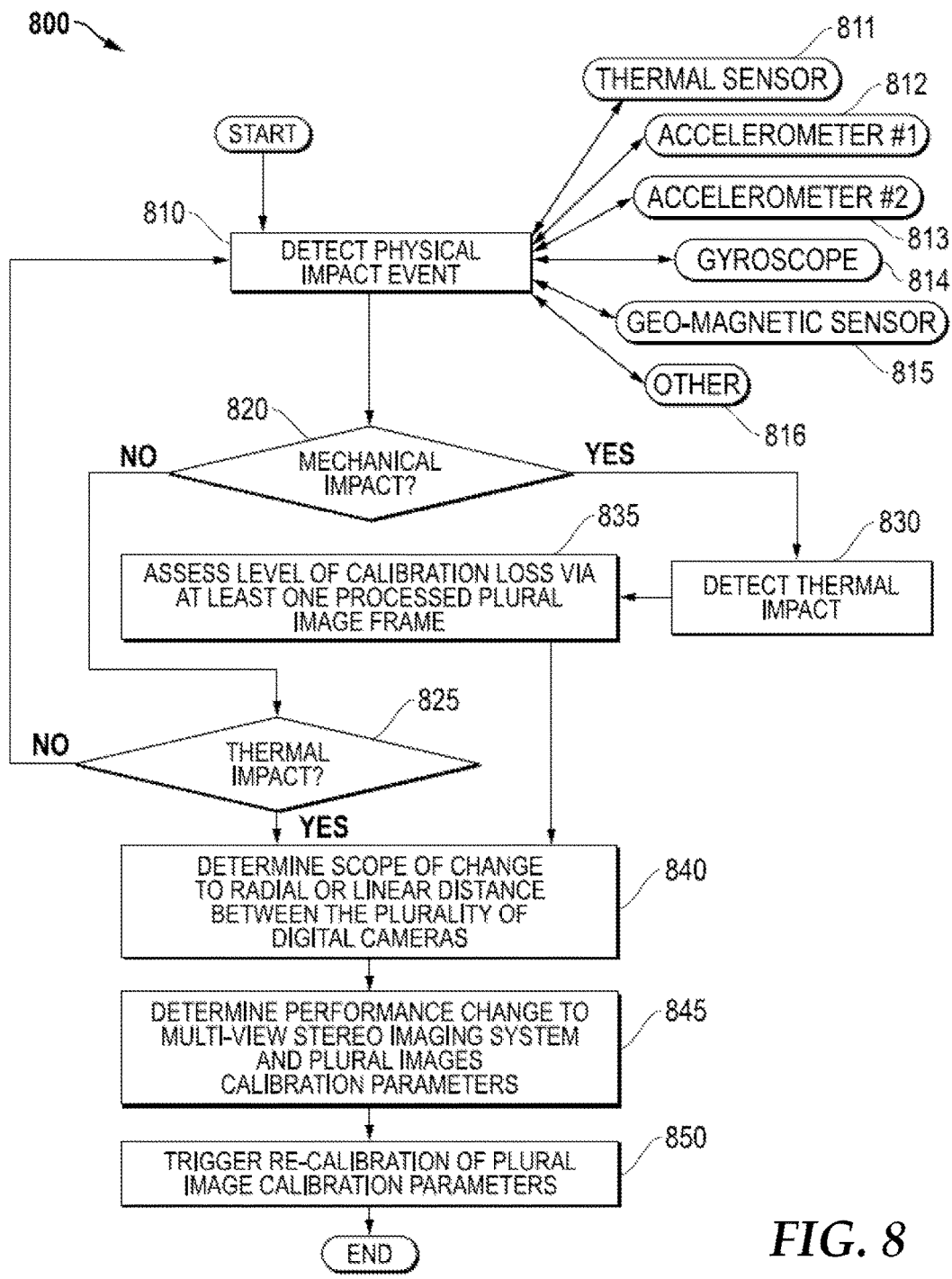
FIG. 8 is a flow diagram illustrating a method of detecting one or more physical impact events and re-calibration of plural image calibration parameters according to an embodiment of the present disclosure.

FIG. 8 is a flow diagram illustrating a method of detecting a plurality of physical impact events causing a multi-view stereo imaging system to be out of calibration according to an embodiment of the present disclosure. In FIG. 8, a physical impact detection system may be used to detect thermal impact events and mechanical impact events including vibration mechanical impact events. The method may also provide recalibration of plural image parameters via at least one plural image frame or raw images comprising the plural image frame acquired during a change in orientation of the plurality of digital cameras due to the physical impact events in an example embodiment.

Method 800 begins in block 810 where the physical impact detection system may operate to monitor for a physical impact event. In another example embodiment, the physical impact detection system may be activated upon detection of motion or detection of an input by a user indicating active usage of the information handling system. In yet other embodiments, the physical impact detection system may be activated upon initiation of the multi-view stereo imaging system for purposes of acquiring plural image frames. In an example embodiment as in other embodiments, the physical impact detection system may receive sensor feedback that includes one or more thermal sensors 811, a first accelerometer 812, a second accelerometer 813, a gyroscope 814, a geo-magnetic sensor 815, and other sensors or systems 816. In example aspects, one or more of the above listed sensors may be mounted on a bracket supporting the one or more digital camera systems or may be on-board sensors to the information handling system.

Flow proceeds to decision block 820 to determine if a mechanical impact event has occurred. The physical impact detection system may a mechanical impact event or a vibration mechanical impact event in accordance with embodiments disclosed herein. If no mechanical impact event or no vibration mechanical impact event is detected that meets a threshold level by the physical impact detection system, flow proceeds to decision block 825. At decision block 825, the physical impact detection system determines whether thermal levels have met or exceeded threshold levels for a thermal impact event. If threshold thermal impact levels have not been met at decision block 825, then flow returns to block 810 to continue monitoring for physical impact events. If at decision block 825, a thermal impact event has met or exceeded threshold levels flow may then proceed to block 840 in the present embodiment. The thermal impact event may be determined in accordance with embodiments disclosed herein. For example, if only a thermal impact event is detected, then the physical impact detection system may coordinate with the multi-camera error compensation system to determine loss of calibration levels and the recalibration necessary. In an example embodiment, the physical impact detection system may access a table disclosing predicted changes in linear distance or parallax or radial angles between the plurality of digital camera systems for thermal effects on a camera mounting bracket. With this information, the performance change or level of calibration loss for plural image calibration parameters may be predictable at block 845. In this example, no other physical impact events are occurring. Proceeding to block 850, re-calibration of plural image parameters may also be predicted based on the predicted level of lost calibration such that recalibration may be conducted by the multi-camera error compensation system according to embodiments disclosed herein.

If at decision block 820 a mechanical impact event meeting a threshold level of force, oscillation or time for a traumatic mechanical impact event or a vibration mechanical impact event, flow proceeds to block 830. At block 830, the physical impact event detection system also determines if a thermal impact event is occurring at or above a threshold level in addition to the one or more mechanical impact events detected. The thermal impact event may be determined in accordance with embodiments disclosed herein. Whether one or more mechanical impact events detected or a thermal impact event is detected, the multi-camera error compensation system calibration check subsystem may proceed to block 835 to determine overall calibration loss. Calibration loss may be confirmed by the multi-camera error compensation system calibration check subsystem according to example embodiments herein. Flow may then proceed to block 840.

At block 840, the physical impact detection system and multi-camera error compensation system may be used in some embodiments to determine a level of change to the radial or linear distance between the plurality of digital cameras. Assessment may include determination of linear distance changes in a bracket and changes in radial angle alignment or parallax angle alignment between plural image frames due to thermal or mechanical effects. While in some embodiments, this aspect may be skipped and changes to plural image calibration parameters simply determined, in other embodiments determination of radial or linear distances and angles of change in the plurality of digital cameras may be useful for diagnostic purposes.

Proceeding to block 845, the multi-camera error compensation system may determine the performance change levels to the multi-view stereo imaging system by virtue of the alteration to the plural digital camera orientations due to the detected thermal and/or mechanical impact events. A query may be prompted to a user for confirmation to trigger recalibration by the calibration engine or may recalibration may be triggered automatically. Calibration may be conducted in accordance with embodiments disclosed herein. For example, comparison of aligned raw images for an acquired plural image frame acquired during the mechanical and/or thermal impact event may be used in accordance with embodiments described herein to determine the level of performance change and related loss of calibration. If a portion of the loss of calibration is a temporary loss of calibration, such as it is in many embodiments of vibration mechanical impact events or thermal impact events, then the performance change and level of calibration loss is associated with only plural image frames acquired during the altered state due to those temporary physical impact events.

Thus, error correction is triggered via the multi-camera error compensation system recalibration engine at block 850 for the plural image frames acquired when a temporary change has occurred to the calibration of the multi-view stereo imaging system. Recalibration may be conducted in accordance with embodiments described above for the plural image parameters used to process the plural image frames. As described in other embodiments, one or more plural image frames including raw images may be used for more accurate assessment of change and recalibration for the multi-view stereo imaging system performance and plural image calibration parameters. Recalibration may be conducted to correct errors of depth distance, rotation, field of view (e.g., stretch or skew in one or more directions) and other plural image parameters. Recalibration of plural image parameters may therefore be conducted in the present embodiment due to detection of one or more physical impact events and error compensation made to correct for the effects of a plurality of physical impact events. At this point, the process may end.

Figure 9:
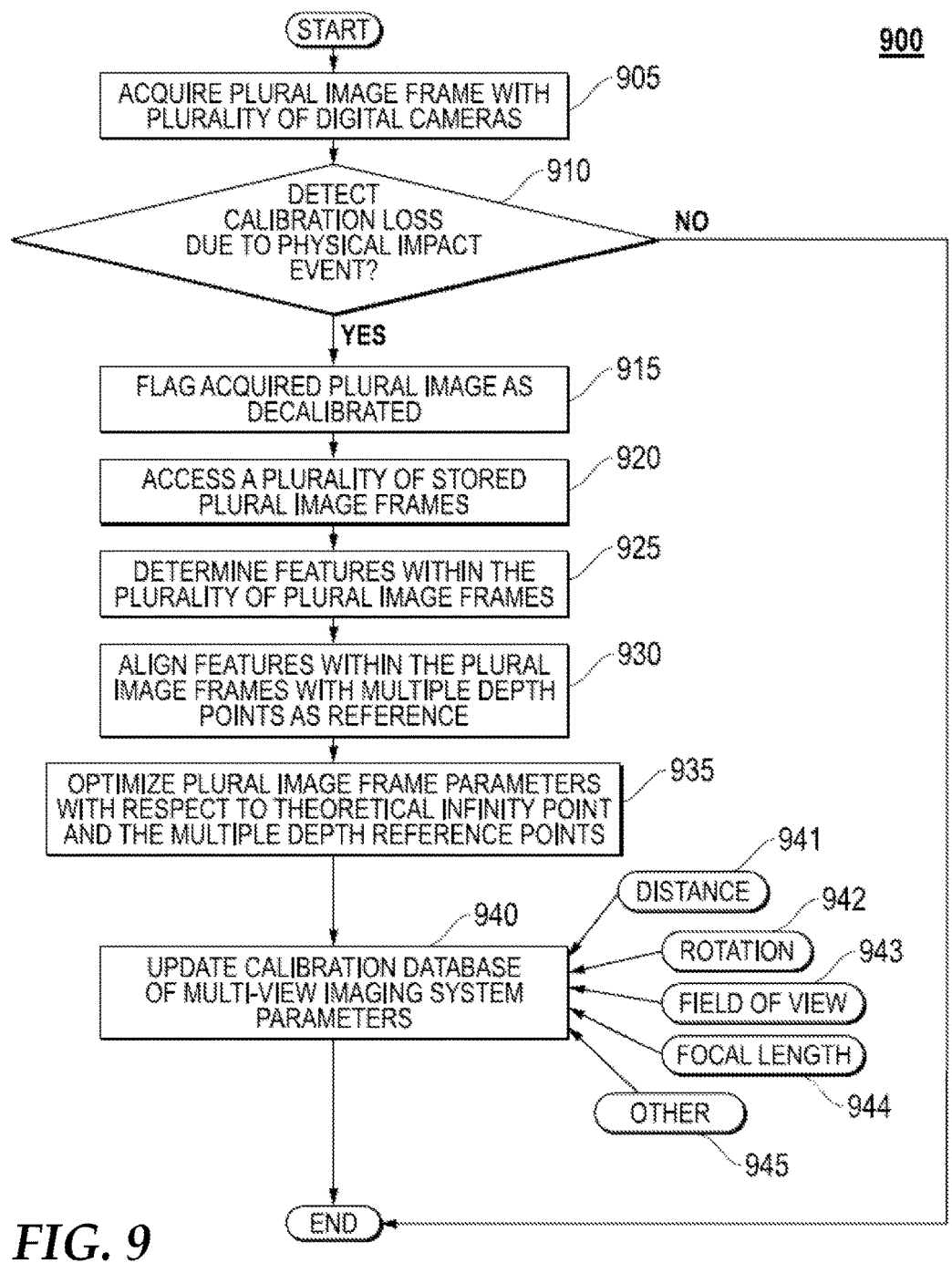
FIG. 9 is a flow diagram illustrating a method of re-calibration via a multi-camera error compensation system according to an embodiment of the present disclosure.

FIG. 9 is a flow diagram illustrating a method of detecting a physical impact event causing a multi-view stereo imaging system to be out of calibration and providing recalibration of plural image parameters via at least one plural image frame or raw images comprising the plural image frame. In accordance with at least one embodiment, a method is performed in an information handling system having a plurality of digital camera systems. A physical impact event may have been detected in accordance with the above embodiments and may include a thermal level, mechanical impact event, or vibration mechanical impact event exceeding a threshold for indicating a loss of calibration. Method 900 begins in block 905 where the plurality of digital camera systems acquires raw images and the raw images are processed into a merged plural image frame. In an example embodiment, the processing of the raw images from the plurality of digital camera systems is conducted by a multi-view stereo imaging system. The processing may include 3D processing for depth within a plural image frame resulting from merger of the raw image frames. As is understood in some embodiments, raw images may be acquired, the raw images may be rectified to align them according to reference points, field of view, rotation, and other factors. Then, in an embodiment, a disparity map is determined to provide reference for pixels within the images relative to parallax angles for the plurality of digital cameras relative to points or objects within the plural images. Calculation of a disparity map will rely on plural image calibration parameters. This disparity information is used to merge the two raw images into a plural image frame with depth parameters, color, and pixel coordinate information for the plural image frame pixels. It is understood additional processing may occur with respect to determination of plural image frames from the recorded raw images at 905.

From block 905, method 900 proceeds to decision block 910. In decision block 910, the method determines if calibration loss has occurred with respect to the multi-view stereo imaging system and the plurality of digital cameras. In one example embodiment, the determination of calibration loss may be based on the physical impact detection system detecting that one or more of a thermal impact threshold, a mechanical impact threshold, a vibration mechanical impact threshold, or another physical impact threshold has been exceeded. For example, the above-described embodiments may be employed in connection with physical sensor data as described to determine that one or more physical impact events have been substantial enough to cause a loss of calibration.

In another example embodiment, a calibration check sub-system may be initiated with respect to one or more stored plural image frames taken during or post physical impact event. For example, a plural image frame may to be taken during a thermal impact event or a vibration mechanical impact event. In another example embodiment, a plural image frame may to be taken after a traumatic mechanical impact event. The calibration check sub-system will analyze correspondences between a plurality of raw images respect to image size, shape, distortion, rotation and other aspects. Comparison of overall image size, shape, distortion, rotation and other aspects between raw images may reveal changes in alignment between digital cameras.

Correspondences between the plurality of images may also be compared relative to features within the images such as corners or edges unique to an area of the image in an example embodiment. The calibration check system may determine if aspects of the area having identifiable features are similar between raw images to identify features for comparison. For example, aspects may include intensity levels, contrast changes, and color profiles. If several are similar, this can match to an image feature. Then assessment may take place relating to values of coordinates between features in different areas of the raw images. Assessment may be made with respect to relationship between two features in the raw images to see if behavior conforms to expected behavior based on pre-existing calibration. For example, if a straight line between two or more feature points is expected or a particular angle is expected between to feature points relative to horizontal or vertical in certain embodiments, then no straight line or differing angles may indicate calibration is in error. In another embodiment, lines between multiple three dimensional distance points of a plural image frame may be projected with an expected convergence, and if the projected lines do not converge as expected that may indicate loss of calibration. In an example embodiment, several feature point relationships across an image may be analyzed to determine a level of error occurrence within the raw images. A minimum number of feature point comparisons may be required. With more feature point comparisons, higher confidence in the calibration check system may be generated to reject false error indicators or to meet a threshold level of confidence to declare the plural image calibration parameters out of calibration with the plurality of digital cameras. Additional other calibration check methods may be used as well to determine whether calibration has been lost.

If there is no calibration loss detected for the multi-view stereo imaging system and the plurality of digital camera systems, then the flow of method 900 ends and may proceed to conduct processing of plural image frames with the multi-view stereo imaging system.

If at decision block 910, loss of calibration is determined via the physical impact detection system, the calibration check sub-systems, or both, the flow of method 900 proceeds to block 915. At block 915, the multi-camera error compensating system may flag an acquired plural image frame or its raw image components as out-of-calibration. The out-of-calibration or decalibration flag designation will be stored with the data for the plural image frame and/or the raw images either of which may be referred to as a plural image. In some instances, a consolidated plural image frame and its component raw images may be stored together as a plural image with a decalibration flag designation. Such a decalibration flag designation may be used to determine need for reprocessing an out-of-calibration plural image frame or to trigger a warning to a user of decalibration as further described in various embodiments in the related case(s) cited herein and incorporated fully by reference.

Flow then proceeds to block 920 where the multi-camera error compensating system will access one or more stored plural image frames. Each plural image frame is determined as to calibration status for use in recalibration. In an example embodiment, a calibration check sub-system may be used to determine calibration status of selected plural image frames. A plurality of selected plural image frames may also be selected relative to any detected physical impact event such as being acquired during or post the physical impact event. In some embodiments, the multi-camera error compensating system may recalibrate based on only one plural image frame. Upon acquiring at least one plural image frame having a loss of calibration, a recalibration engine may begin recalibration of plural image parameters. In some embodiments, one plural image frame may be used for calibration however it is understood that two or more plural image frames are useful for enhanced reliability of the recalibration process.

Proceeding to block 925, the multi-camera error compensating system dynamic calibration engine will determine features within the accessed plural image frame or frames. As described above, the image features may include corners, edges and other features with similar intensity, contrast changes, color profiles or the like between raw images comprising the plural image. At block 930, the features are aligned according to multiple depth point references so that similar depth points are aligned between the raw images and between a plurality of plural image frames. In this way, the raw images are fit together with respect to depth points within the plural image frames. In an embodiment, several points at depth are utilized as reference points. Based on reference points within the plural image frame or frames, lines of depth may be projected on to a point at theoretical infinity at block 935. Thus the aligned depth reference points for a plural image frame may show alignment of projected depth lines to a theoretical infinity point. This may be repeated with respect to additional plural image frames. The projection from the plurality of depth reference distance points to a theoretical infinity point allows determination of error levels of depth distance, rotation, field of view (e.g., stretch or skew in one or more directions) due to non-convergence of projections to theoretical infinity. In an example embodiment, backward optimization may then be used to correct the convergence from the depth distance reference points for correction to depth distance relationships to pixel shift based on parallax angles from the plurality of digital camera systems. Similarly, rotation deviation from expected angles between sets of feature reference points may be used to backwards optimize rotation parameter values in another example embodiment.

At block 940, plural image calibration parameters may be backwards-optimized based on the multiple depth reference points and convergence projections to a point at theoretical infinity. Based on these multiple depth points from one or more plural frames, alignment for depth distances 941, rotation 942, field of view 943, and focal lengths 944 may be recalibrated with respect to the plurality of digital camera systems. Rotation angles may also be determined based on angle misalignment of a theoretical line between two or more known depth reference points between raw images comprising a dual image frame. Thus, necessary rotation rectification may be determined between the raw images recorded on the plurality of digital camera systems. Similarly, field of view dimensions may stretch, squash or otherwise skew the pixel fields between digital camera systems. Rectification factors for calibration of field of view dimensions relative to pixel arrays between raw images may be similarly be modified based on determination of known reference depth points upon recalibration. With more reference points from more plural image frames, additional reliability of backwards optimization may be made with respect to depth distances relative to parallax camera recording angles, rotation of images with any required rotational rectification, field of view dimensions with necessary rectification for field of view between raw images, and focal length changes or alterations to the digital camera systems.

With these plural image calibration parameters recalibrated by the above procedure and the changes stored for use with the multi-view stereo imaging system. Depending upon the type of physical impact event, the updated plural image calibration parameters may be temporarily modified or may be more permanently modified. In one example aspect, a traumatic mechanical impact event may alter the orientation of the plurality of digital cameras with respect to one another or directionally in a more permanent way. The traumatic mechanical event may alter digital camera mountings or change bracket dimensions or orientations. In another example aspect, a vibration mechanical impact event may alter the orientation of the plurality of digital cameras with respect to one another or directionally only for a single acquired plural image frame or a set of plural image frames acquired during that vibration event. The calibration changes may be therefore associated specifically with only the affected plural image frames. In yet another aspect, a thermal impact event may alter the orientation of the plurality of digital cameras with respect to one another or directionally in a temporary way which may be repeatable and predictable such that recalibration may be associated with a detected temperature change of a given magnitude on a bracket or other part of the information handling system. Alternatively, the plural image calibration parameter recalibration may be associated with the plural image frames acquired only during a thermal impact event. At this point, the flow may end.

It is understood that in any of the steps for method algorithms described in the present disclosure in FIGS. 5-9 or elsewhere herein may be used in embodiment variations. For example, steps for the algorithms described may be omitted or conducted in any order or some steps may be conducted simultaneously. One or more additional steps may also be added in any of the described algorithm methods and any portion of any of the algorithm methods described herein may be combined with any other algorithm method portion as would be understood in the art. The described algorithms are meant as exemplary embodiments and variations to those method algorithms are anticipated in accordance with the present disclosure.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as a processor, an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as an Intel® Core™ or ARM® RISC brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer-implemented method for determining a loss of calibration in a multi-view stereo imaging system comprising:
    executing instructions, via a processor, for a multi-view stereo imaging system to process a plural image frame recorded from a plurality of digital cameras of an information handling system and based on plural image calibration parameters;
    detecting a physical impact event, via a physical sensor, to an information handling system; and
    executing instructions, via the processor, for a physical impact event detection system to determine based on physical sensor feedback data whether a threshold level of a physical impact event has been reached to affect calibration of the multi-view stereo imaging system,
    wherein the detected physical impact event is at least a mechanical collision impact event measured by the physical impact sensor.

2. The method of claim 1 further comprising:
    detecting a calibration loss of at least one digital camera based on at least one processed plural image frame.

3. The method of claim 1 wherein a level of the physical impact event determined by the physical impact event detection system corresponds to a predicted change to the plural image calibration parameters.

4. The method of claim 1 further comprising:
    determining the effect on calibration of the multi-view stereo imaging system by a thermal impact event and predicting a thermal expansion shifting a distance between the plurality of digital cameras.

5. The method of claim 1 further comprising:
triggering re-calibration of the plural image calibration parameters based upon the determination that the threshold level of the physical impact event has been reached.

6. The method of claim 1 further comprising:
activating monitoring by the physical impact event detection system in response to detecting usage activity of the information handling system.

7. The method of claim 1 further comprising:
detecting the mechanical impact event to a bracket operatively coupled to the plurality of digital cameras; and
determining the calibration loss of the multi-view stereo imaging system due to detected force to cause a shift in alignment between the plurality of digital cameras.

8. An information handling system comprising:
a plurality of digital cameras;
a processor operatively coupled to the plurality of digital cameras for executing instructions for a multi-view stereo imaging system to process a plural image frame based on plural image calibration parameters;
a physical sensor for detecting a physical impact event to the information handling system;
a memory operatively coupled to the processor, the memory for storing recorded physical sensor feedback data of the detected physical impact event; and
the processor executing instructions for a physical impact event detection system to determine a loss of calibration to the multi-view stereo imaging system based on physical sensor feedback data,
wherein the physical sensor is at least an accelerometer.

9. The information handling system of claim 8 wherein the plural image calibration parameters include a depth distance for objects recorded in the plural image frame.

10. The information handling system of claim 8 wherein the detected level of the physical impact event determined by the physical impact event detection system corresponds to a predicted change to the plural image calibration parameters.

11. The information handling system of claim 8 wherein the physical impact event to the information handling system further includes detecting a thermal impact event via a thermal sensor to a bracket system operatively coupled to the plurality of digital cameras.

12. The information handling system of claim 11 further comprising:
the physical impact event detection system determines the detected level of the physical impact event to the multi-view stereo imaging system and a corresponding estimated shift in a distance between the plurality of digital cameras based on predicted thermal expansion.

13. The information handling system of claim 11 further comprising:
the accelerometer detects a mechanical impact event to a bracket system operatively coupled to the plurality of digital cameras; and
the physical impact event detection system determines that a threshold level of the mechanical impact event has been reached to affect calibration of the multi-view stereo imaging system due to force experienced by the bracket system.

14. The information handling system of claim 8 further comprising:
the physical impact event detection system triggering re-calibration of the plural image calibration parameters.

15. The information handling system of claim 8 further comprising:
the physical impact event detection system prompting a user interface querying user feedback for re-calibration of the multi-view stereo imaging system.

16. A computer-implemented method for determining a performance change in a multi-view stereo imaging system comprising:
executing instructions, via a processor, for a multi-view stereo imaging system to process a plural image frame recorded from a plurality of digital cameras of an information handling system and based on plural image calibration parameters;
detecting a physical impact event, via a physical sensor, to an information handling system wherein the physical impact event alters an alignment between the plurality of digital cameras;
executing instructions, via the processor, for a physical impact event detection system to determine that a threshold level of the physical impact event has been reached based on physical sensor feedback data; and
triggering re-calibration of at least one plural image calibration parameter based upon the determination that the threshold level of physical impact event has been reached,
wherein the detected physical impact event is at least a mechanical collision impact event measured by the physical impact sensor.

17. The method of claim 16 wherein a detected level of the physical impact event determined by the physical impact event detection system corresponds to a predicted change to the plural image calibration parameters.

18. The method of claim 16 further comprising:
prompting a user interface querying user feedback permitting re-calibration of the multi-view stereo imaging system.

19. The method of claim 16 further comprising:
detecting the mechanical physical impact event to the plurality of digital cameras of the information handling system via an accelerometer detecting vibration; and
determining the calibration loss of the multi-view stereo imaging system due to detected vibration force and frequency to cause a shift in alignment between the plurality of digital cameras.

20. The method of claim 16 further comprising:
detecting the mechanical physical impact event to the plurality of digital cameras of the information handling system that is a thermal impact event via a thermal sensor detecting temperature; and
determining the calibration loss of the multi-view stereo imaging system due to detected temperature causing a shift in alignment between the plurality of digital cameras.

* * * * *